Figure 1:
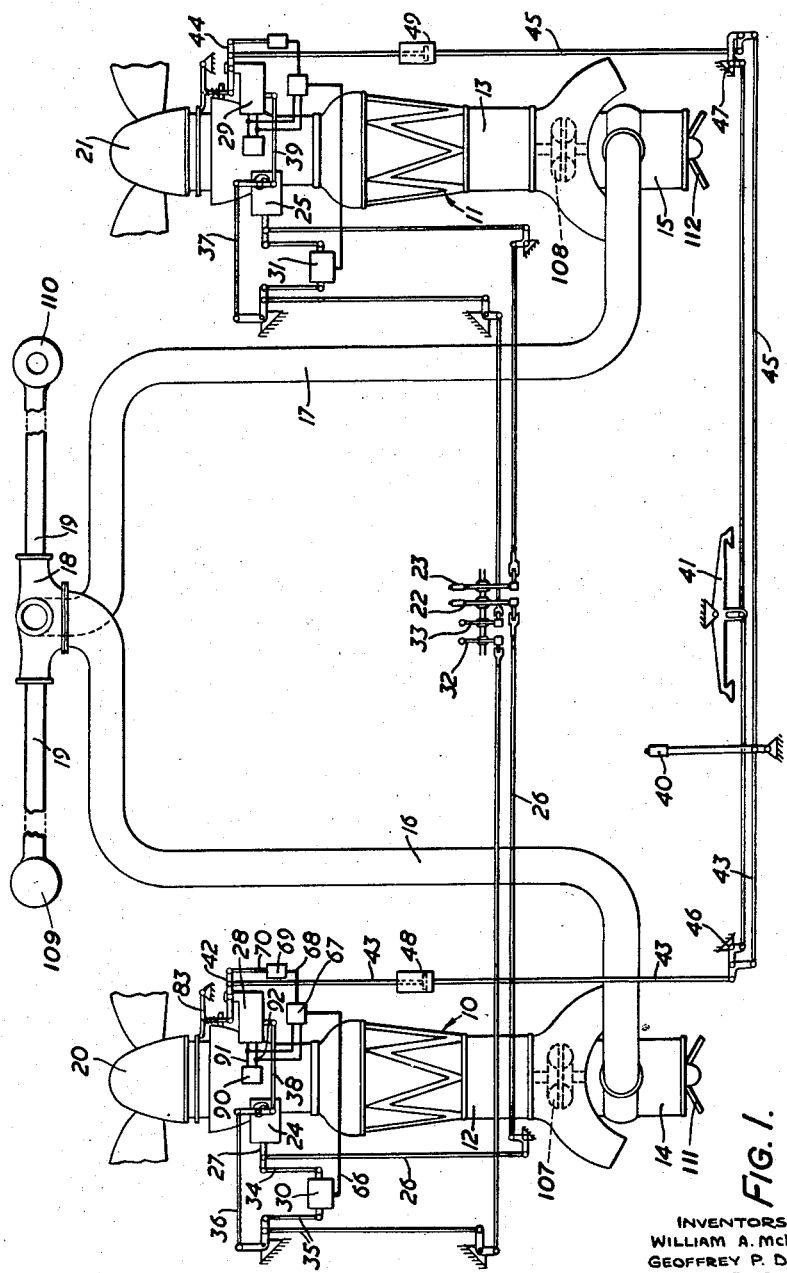

Feb. 23, 1960 W. A. McKEGGIE ET AL 2,925,867
CONTROL SYSTEMS FOR AIRCRAFT ENGINES
Filed Nov. 12, 1957 2 Sheets-Sheet 2

INVENTORS
WILLIAM A. McKEGGIE
GEOFFREY P. DOREY
THOMAS E. GODDEN
EDWARD H. MORRIS
RAYMOND A. COTTON
BY Watson, Cole, Grindle and Watson

ATTORNEY

United States Patent Office 2,925,867
Patented Feb. 23, 1960

2,925,867

CONTROL SYSTEMS FOR AIRCRAFT ENGINES

William Arthur McKeggie, Teddington, Geoffrey Peter Dorey, Northolt Park, and Thomas Edward Godden, Edward Hollingworth Morris, and Raymond Arthur Cotton, Gloucester, England, assignors to D. Napier & Son Limited, and Rotol Limited, both of London, England, and both British companies Application November 12, 1957, Serial No. 695,919

Claims priority, application Great Britain November 13, 1956

12 Claims. (Cl. 170—135.22)

This invention relates to a control system for an aircraft engine provided with an automatic device for controlling the power output, which output, in a certain operating condition of the aircraft, is shared between a variable pitch airscrew and some other power consumer such as a rotary wing system, the airscrew pitch being under the control of the pilot while this operating condition prevails.

By varying the airscrew pitch the pilot can control the propulsive thrust exerted by the airscrew, but such pitch variations also alter the amount of power absorbed by the airscrew and consequently alter the total power required from the engine. The said automatic device for controlling will adjust the power output, within limits, to meet such alterations in the total power requirement. Should the pilot apply such a coarse pitch to the airscrew that the total power requirement exceeds the upper limit of engine output the engine will be overloaded and may stall or suffer damage.

This risk is avoided by the present invention, according to which the automatic power controlling device is arranged to actuate an over-ride device which automatically reduces the airscrew pitch (i.e. sets a finer pitch) should the automatic power controlling device attempt to increase the power output above an upper limit. The operation of the over-ride device thus automatically reduces the total power requirement to a value not exceeding the permissible maximum power output of the engine.

The invention is primarily concerned with, and was developed for, the solution of a particular control problem encountered in a multi-engined (more particularly a twin-engined) aircraft designed for two distinct operating conditions, namely operation as an aeroplane in which condition at least a major proportion of the engine power output is used to drive variable pitch airscrews which provide forward propulsion, and operation as a helicopter in which condition a major proportion of the engine power output is used to drive the rotary wing system or rotor but some of the power output is available for driving the airscrews, the pitch of the airscrews being under the pilot's control individually during helicopter operation so that he can control the aircraft in yaw. The engines of this particular aircraft are of the "turbo-prop" type. It will be appreciated, nevertheless, that the invention is also applicable to other forms of aircraft and to other types of engine. For convenience, however, the invention will be described primarily in relation to the particular case mentioned.

For the forward flight or "aeroplane" condition the operative parts of the control system of each engine are of a known form, the system being set by the pilot to provide a selected power output and to cause the engine to rotate at a speed appropriate to this output, the fuel being metered automatically to maintain the selected power output despite changes in ambient conditions and other variables, and the airscrew pitch being under the control of an automatic pitch control unit containing a constant speed governor which automatically adjusts the pitch so that the required engine speed is maintained.

For the "helicopter" condition regulation of the engine speed by airscrew pitch adjustments would be liable to become erratic, so different operative parts of the control system are provided for this condition. In the "helicopter" condition the pilot sets a selected engine speed on an automatic power controlling device containing a speed governor which, within limits, adjusts the fuel supply automatically to maintain the engine speed at the selected value despite variations in load. This device is herein termed a throttle governor. In the "helicopter" condition control of the airscrew pitch is transferred from the automatic pitch control unit to the pilot, the pitch control unit being rendered inoperative upon the pitch adjusting mechanism, so that by varying the pitch of the two airscrews individually the pilot can control the aircraft in yaw. These variations in pitch alter the loads on the engines which are compensated automatically by the throttle governors making variations in the fuel supply to the individual engines. In the event of the pilot setting a pitch that would overload an engine, the throttle governor of this engine will attempt to increase the power output above an upper limit, that is the limit corresponding to the permissible full load fuel supply, and this action of the throttle governor is arranged to actuate automatically the over-ride device for reducing the pitch of the corresponding airscrew.

The over-ride device conveniently comprises a servo motor which acts on an interconnection between the pilot's pitch control and the pitch adjusting mechanism, in the sense of causing the adjusting mechanism to reduce the pitch when the servo motor is actuated. This servo motor may be arranged to be actuated by the throttle governor in the event of an overload causing the throttle governor to move to a position beyond its maximum fuel position.

Preferably means are provided for rendering the over-ride device inoperative when the torque delivered by the engine is below a predetermined low value. Such means may comprise a valve between the throttle governor and the over-ride servo motor actuated by a torque meter disposed in the drive between the engine and the airscrew and adapted to be opened only when the torque exceeds the said predetermined low value.

The torque meter may also control a device for actuating the pitch adjusting mechanism automatically, over-riding all other influences acting on that mechanism, for setting the airscrew into a coarse pitch position on the occurrence of a reverse or negative torque. Thus, should there be a failure in the engine or airscrew the airscrew will automatically take up its coarse pitch position in which it offers minimum drag. This device may remain operative in both the "aeroplane" and "helicopter" conditions.

Figure 2:
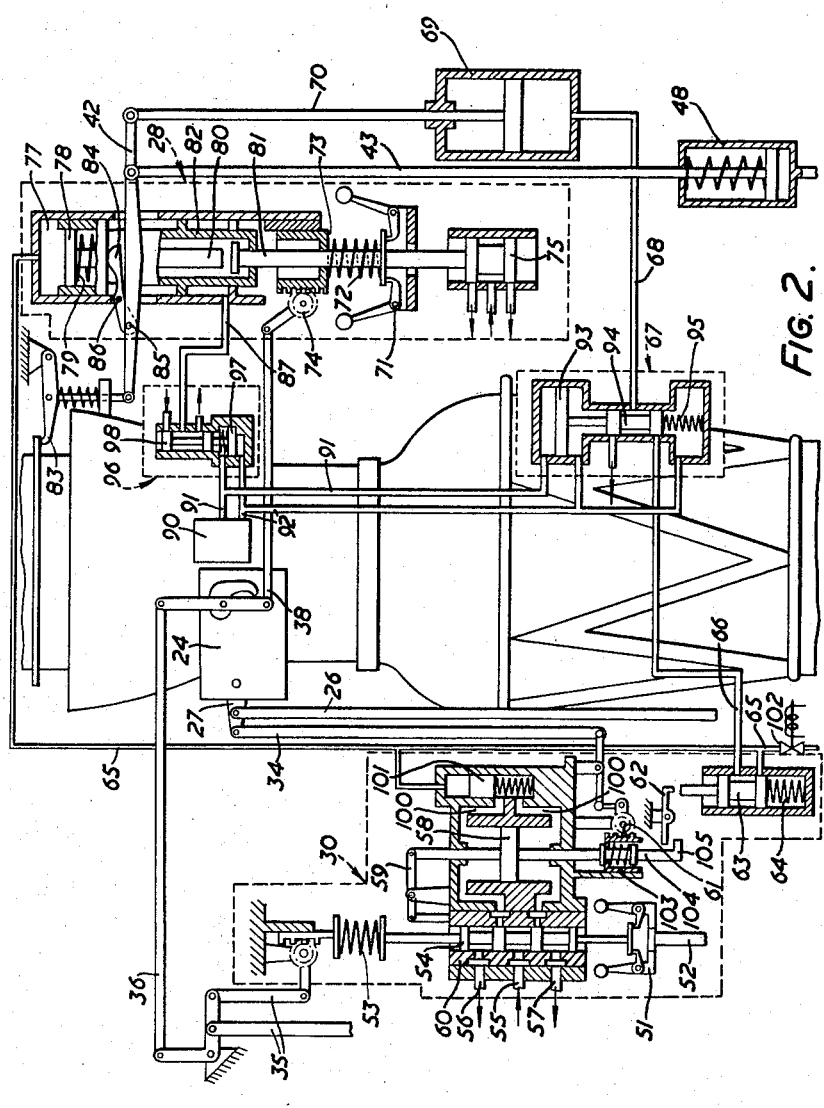

The invention may be performed in various ways and one particular embodiment, as applied to the particular twin-engined aircraft already mentioned, will now be described by way of example with reference to the accompanying drawings, in which:

Figure 1 is a diagram showing the two engines, the helicopter rotor head, and the interconnecting control arrangements; and Figure 2 is a diagrammatic view, partly in section and on a larger scale, of the control system for the left-hand engine.

Referring to Figure 1, a twin-engined aircraft designed to operate as a helicopter for take-off and landing and as an aeroplane for forward flight has two "turbo-prop" type engines 10 and 11. During helicopter operation the major proportions of the outputs of the turbines 12 and 13 of the engines 10 and 11 respectively are used to drive auxiliary air compressors 14 and 15 respectively. The auxiliary air compressors are connected to their respective turbines by disengageable clutches 107 and 108. The auxiliary compressors 14 and 15 supply compressed air through pipes 16 and 17 respectively to the helicopter rotor head 18, from which the compressed air flows through hollow rotor blades 19 to jet units 109 and 110 at the rotor blade tips for rotating the rotor. The remainder of the output of the turbine 12 of the engine 10 is used to drive a variable pitch airscrew 20, and similarly the remaining output of the turbine 13 is used to drive a variable pitch airscrew 21.

For operation as an aeroplane each engine 10, 11 works as a conventional "turbo-prop" engine, virtually the whole of the engine output being used for driving the variable pitch airscrews 20, 21. The compressors 14 and 15 are declutched from the turbines 12 and 13 and their air inlets are throttled by shutters 111 and 112 respectively. The rotor 18, 19 continues to rotate by autorotation and provides at least a part of the lift of the aircraft.

There are speed and power controls 22 and 23 for the engines 10 and 11 respectively, which controls are actuated by the pilot only during operation as an aeroplane and by means of which the pilot sets the power outputs of the respective engines and corresponding datum speeds at which the engines are to rotate for optimum efficiency at the set output. The power output of each engine is maintained constant at the value set by the pilot's control 22 or 23, despite changes in ambient conditions, by an automatic fuel metering unit 24 or 25. The automatic fuel metering unit 24 of the engine 10 is connected to the corresponding pilot's control 22 through a linkage 26 and a lever 27, and there is a corresponding linkage between the pilot's control 23 and the fuel metering unit 25 of the engine 11. Each fuel metering unit is of known construction and its details form no part of the present invention, so it need not be further described. During operation as an aeroplane the pitch of each airscrew 20 or 21 is adjusted automatically by a pitch control unit 28 or 29 respectively, which acts on the pitch-adjusting mechanism of the airscrew so that the airscrew is automatically set to the pitch necessary to maintain the speed of its engine constant at the datum value as set by the appropriate pilot's control 22 or 23. Thus during aeroplane operation the pilot has no direct control over the pitch of the airscrews 20, 21, control of the pitch and the fuel supply to the engines 10 and 11 being effected automatically by the pitch control units 28 and 29 and by the fuel metering units 24 and 25 respectively, in accordance with the setting of the pilot's controls 22 and 23. This system provides maximum fuel economy for cruising in the aeroplane condition.

For operation in the helicopter condition airscrew pitch changes are less effective in controlling the engine speed. Moreover, in this condition it is desirable for the pilot to have direct control not only over the speeds of the engines but also over the pitch or both airscrews in order to provide him with adequate control over the aircraft in yaw. Since effective automatic control of the engine speeds by means of the airscrews 20, 21 is not attainable in helicopter operation, for such operation certain parts of the control system influenced by the pilot's controls 22, 23 are put out of action and other parts are brought into operation. These other parts of the control system include throttle governors 30 and 31 for the engines 10 and 11 respectively, each adapted automatically to regulate the fuel supply to its appropriate engine so as to keep the engine speed constant at a datum value set by the pilot by means of an over-ride control 32 or 33 respectively. If the load on an engine, for instance the engine 10, is increased, it tends to reduce the engine speed, whereupon the throttle governor 30 automatically increases the fuel supply to this engine by acting on the fuel metering unit 24 through a linkage 34 connected to the lever 27, and restores the speed of the engine 10 to the datum value. The throttle governor 30 is influenced by the pilot's over-ride control 32 through a linkage 35, so that the pilot can adjust the datum value of the speed of the engine 10 by means of the over-ride control 32. He exerts similar control over the speed of the engine 11 by means of the over-ride control 33.

It may be mentioned here that the over-ride controls 32, 33 are also operable during aeroplane operation, on the fuel metering units 24 and 25 through linkages 36 and 37 respectively, and on the pitch control units 28 and 29 through linkages 38, 39 respectively, for over-riding the automatic control of the engines 10 and 11 during aeroplane operation and giving the pilot direct control over the speeds of the engines in an emergency.

During helicopter operation the pilot has direct control over the pitch of the airscrews 20 and 21, both collectively by means of a common pitch control 40 and differentially by means of a rudder bar 41. The common pitch control 40 is connected to an operating lever 42 for the pitch control unit 28 through a linkage 43, and to the corresponding operating lever 44 of the pitch control unit 29 through a linkage 45. The arrangement of these linkages is such that, with the rudder bar 41 central, a given movement of the common pitch control 40 will adjust the pitch of the two airscrews 20 and 21 simultaneously and equally. To control the aircraft in yaw the rudder bar 41 can be used which, through bell crank lever connections 46 and 47 associated with the linkages 43 and 45 respectively, adjusts the pitches of the airscrews 20 and 21 differentially in opposite directions. The linkages 43 and 45 include spring-loaded lost motion devices 48 and 49 respectively, for a purpose to be described.

As previously indicated, during helicopter operation the pilot also has control over the fuel supply to the engines 10 and 11 through the over-ride controls 32, 33. It is necessary, however, to limit the maximum amount of fuel that is supplied to each engine at any particular engine speed, to avoid overheating. On the other hand, if the load on an engine continues to increase after the throttle governor 30 or 31 has adjusted the fuel supply to the maximum amount permitted, the engine will no longer be able to maintain its datum speed and may stall. In accordance with the invention, automatic means are provided which are operative during helicopter operation to prevent the pilot from overloading the engines by setting the airscrews 20 and 21 to such a coarse pitch that they would require more power from the engines than the surplus available over the power requirements of the auxiliary compressors 14 and 15.

Referring now to Figure 2, on the left-hand side of this figure there is shown a diagrammatic representation of the throttle governor 30 of the engine 10, and associated parts. The throttle governor 31 of the engine 11 is of identical construction and need not be described separately. The throttle governor 30 includes a centrifugal governor 51 which is driven by the engine 10 through a shaft 52 and which is loaded by a spring 53. The loading of the spring 53, and hence the speed setting of the governor 51, is under the control of the pilot through the over-ride lever 32 and the linkage 35. The governor 51 controls the position of a piston valve 54 which in turn controls the admission and discharge of pressure fluid to and from opposite ends of a servo motor 58, the pressure fluid being admitted through a supply pipe 55 and discharged through drain pipes 56 or 57. The piston of the servo motor 58 is connected by means of a feed-back linkage 59 to a ported sleeve 60 surrounding the piston valve 54, to eliminate over-regulation.

The opposite ends of the servo motor 58 are connected by a by-pass 100 controlled by a valve 101. When this valve is in the raised position shown in the drawing the by-pass 100 is open and the throttle governor 30 is inoperative. This condition prevails during aeroplane operation. To render the throttle governor operative for helicopter operation the pilot opens an electrically-actuated valve 102 in a pipe 65, which admits pressure fluid to this pipe, thereby depressing the valve 101 and closing the by-pass 100. When the throttle governor is operative, i.e. during helicopter operation, the position of the piston of the servo motor 58 influences the linkage 34 through a rack and pinion device 61, so that movements of the piston adjust the fuel metering device 24. The movements of the lever 27 of the fuel metering device 24 caused by the throttle governor 30 will be transmitted back through the linkage 26 to the pilot's control 22 which will move in sympathy and which, during helicopter operation, the pilot does not touch.

When the piston of the servo motor 58 is nearing its upper end position in response to a drop in engine speed resulting from an increase in load on the engine, it reaches a point at which the engine is being given its maximum permissible amount of fuel and the lever 27 of the fuel metering device 24 can move no further. Should the engine power output still be insufficient for the load applied, so that the speed continues to fall, the governor 51 moves the piston of the servo motor 58 upwardly for a further short distance. This extra upward movement is permitted by a lost motion device 103 interposed between the piston rod 104 of the servo motor 58 and the rack and pinion device 61. During this extra upward movement of the piston a catch 105 on the piston rod 104 tilts a lever 62 in the clockwise direction as shown in Figure 2 and depresses a valve 63 which is normally urged by a spring 64 into its upper position as illustrated. When the valve 63 is thus depressed it admits pressure fluid from the pipe 65 into a pipe 66 leading to a torque-sensitive valve 67 and, when this valve is open, into a further pipe 68 leading to a pitch over-ride servo motor 69.

The pitch over-ride servo motor 69 is connected by a link 70 to the operating lever 42 of the pitch control unit 28. The spring-loaded lost motion device 48 in the linkage 43, which is also attached to the operating lever 42, permits the pitch over-ride servo motor 69 to move the operating lever 42 to actuate the pitch control unit 28 in a manner to be described, in the sense of reducing the pitch of the airscrew 20, even though the position of the collective pitch control 40 and/or the rudder bar 41 correspond to a coarser pitch. Thus, the pitch over-ride servo motor 69 automatically over-rides the pilot's pitch control 40 or 41 to reduce the pitch of the airscrew 20 to a safe value should the pilot have required too coarse a pitch from the airscrew 20, i.e. a pitch at which the airscrew 20 would absorb more power than the surplus available from the engine 10.

The parts of the pitch control unit 28 which are operative during aeroplane operation will now be described. A centrifugal governor 71 is driven by the engine and is loaded by a spring 72, the loading of which is determined by a movable abutment 73 actuated through a rack and pinion mechanism 74 from an output member of the fuel metering unit 24 through the linkage 38. The position of the linkage 38, and hence the loading of the spring 72, is determined automatically by the fuel metering unit 24 in response not only to the setting of the pilot's control lever 22 acting on the fuel metering unit 24 through the linkage 26 and the lever 27, but also in dependence on factors such as the air pressure and air temperature at the inlet to the main compressor of the engine 10 which affect the fuel metering unit in a known manner, for instance as disclosed in U.S. Patent No. 2,474,033 of Chamberlin et al. issued June 21, 1949. As therein described, these factors are automatically co-related by the fuel metering unit to determine a correct value for the engine speed. The position of the linkage 38, and hence the loading of the spring 72, can also be controlled by the over-ride control 32 acting through the linkage 35 and 36. The governor 71 automatically controls the pitch of the airscrew 20 during aeroplane operation by means of a hydraulic pitch-adjusting mechanism contained in the airscrew hub and influenced by a hydraulic control valve 75 in a known manner. A rod 81 connects the governor 71 to the control valve 75.

During helicopter operation the influence of the governor 71 on the pitch of the airscrew 20 is eliminated. For this purpose pressure fluid is introduced through the pipe 65 to a chamber 77 in the pitch control unit 28, which has the effect of depressing a piston 78 against the action of a spring 79 and thereby depressing a stem 80 to clamp the upper end of the rod 81 of the governor 71 between the lower end of a sleeve 82 and the stem 80, so that the rod 81 and the pitch control valve 75 will partake of any movements which may be applied to the sleeve 82, overriding the governor 71. The position of the sleeve 82 is determined by the operating lever 42 in dependence either on the position of the linkage 43 actuated by the pilot or, over-riding this linkage, by the pitch over-ride servo motor 69. A feed-back lever 83 acts on the other end of the operating lever 42, the feed-back lever sensing the actual pitch of the airscrew 20. The position of the operating lever 42 is determined by the position of its three points of connection, to the linkage 43, to the link 70 of the pitch over-ride servo motor, and to the feed-back lever 83 respectively, and this position influences the position of the sleeve 82 through an intermediate lever 84 which is pivoted to the operating lever 42 at the point 85 and to the casing of the pitch control unit 28 at the point 86. The position of the sleeve 82 can also be influenced by pressure fluid admitted through a pipe 87 in circumstances to be described.

Included in the drive between the engine 10 and the airscrew 20 there is a torque meter 90. This torque meter is of known construction and need not be described further. It is arranged to maintain a supply of high pressure fluid in a pipe 91 during normal operation, as soon as the torque delivered to the airscrew has attained a relatively low value, and to admit a supply of high pressure fluid to a pipe 92 should there be a reversal of torque, for instance in the event of a failure of the engine or the airscrew. The pipes 91 and 92 are both connected to the torque-sensitive valve 67. This valve includes an operating piston 93 the space above which communicates with the pipe 91 and the space below which communicates with the pipe 92. The piston 93 is connected to a valve member 94 which is urged upwardly by a spring 95. In ordinary operation, when the torque transmitted to the airscrew 20 has attained the said low value, high pressure fluid is admitted to the space above the piston 93 through the pipe 91 to depress the valve member 94 and establish communication between the pipes 66 and 68 so that in the event of the valve 63 being opened the pitch over-ride servo motor 69 will be operated. Should the torque fall below the said low value or should there be a reversal of torque, for instance in the event of a failure in the engine or the airscrew, communication between the pipes 66 and 68 will be cut off and the pitch over-ride servo motor 69 put out of action, whereby automatic pitch coarsening by a torque-sensitive valve 96 now to be described will not be prevented. The torque-sensitive valve 96 provides automatic pitch coarsening, in both helicopter and aeroplane operation, to reduce airscrew drag in the event of an engine failure. This valve responds to a torque reversal such as would occur due to such a failure. The valve 96 includes a servo motor piston 97 the upper surface of which communicates with the pipe 91. In normal operation the pressure in the pipe 91 will depress the servo motor piston 97 and so hold a valve member 98 in the position in which it is shown in the drawing, whereby the pipe 87 leading to the pitch control unit 28 is relieved of pressure. The underside of the servo motor piston 97 communicates with the pipe 92, so that in the event of a torque reversal the pressure in the pipe 92 will raise the piston 97 and the valve member 98, thereby admitting pressure fluid to the pipe 87. This will raise the sleeve 82 to its highest position, thereby raising the rod 81 and the pitch control valve 75, causing the pitch-adjusting mechanism to set the airscrew 20 into its maximum coarse pitch position in which it offers minimum drag.

The differences and similarities between the aeroplane and helicopter operating conditions are summarised as follows:

*Operation as an aeroplane*

Engines drive the airscrews only.
The rotor rotates by auto-rotation.
The pilot controls the engine output by his controls 22 and 23 acting directly on the fuel metering devices 24 and 25.
The throttle governors 30 and 31 are inoperative, the by-passes 100 being open.
The airscrew pitch is automatically controlled by the pitch control units 28 and 29, the pitch governors 71 being operative as the rods 81 are disconnected from the sleeves 82. The airscrew pitch manual controls 40 and 41 are inoperative as there are no direct connections between the operating levers 42 and the pitch control valves 75.
The over-ride pitch servos 69 are inoperative as the throttle governors 30 and 31 are inoperative and the operating levers 42 are disconnected from the pitch control valves 75.
The low-torque-sensitive valves 67 are ineffective.
The reverse-torque-sensitive pitch coarsening valves 96 are operative.

*Operation as a helicopter*

Engines drive the auxiliary compressors, only surplus power being available at the airscrews.
The rotor is driven by tip jets supplied with air by the auxiliary compressors.
The pilot controls the engine output by the over-ride controls 32 and 33 acting on the throttle governors 30 and 31 which in turn act on the fuel metering devices 24 and 25.
The throttle governors 30 and 31 are operative, the by-passes 100 being closed.
The airscrew pitch is controlled by the pilot, collectively by his collective pitch control 40 and individually by his rudder bar 41, the pitch governors 71 being inoperative as the rods 81 are clamped to the sleeves 82 thereby connecting the operating levers 42 to the pitch control valves 75.
The over-ride pitch servos 69 are operative as the throttle governors 30 and 31 are operative and the operating levers 42 are connected to the pitch control valves 75.
The low-torque-sensitive valves 67 are operative to cut out the over-ride pitch servos 69 at low and reverse torques.
The reverse-torque-sensitive pitch coarsening valves 96 are operative.

It will be appreciated that numerous modifications and refinements may be made to the control system described, only sufficient detail of which has been described and illustrated to afford an adequate understanding of the invention.

What we claim as our invention and desire to secure by Letters Patent:

1. An aircraft propulsion unit comprising an engine, a power consumer consisting of a variable pitch airscrew, a driving connection between said engine and said airscrew, another power consumer, a driving connection between said engine and said other power consumer operative in a certain flight condition of the aircraft, and a control system for said propulsion unit, said control system comprising an automatic power control device which controls the power output of said engine, mechanism for adjusting the pitch of said airscrew, a pilot's airscrew pitch control, a connection between said pilot's airscrew pitch control and said pitch control mechanism, a pitch over-ride device, an operative connection between said pitch over-ride device and said pitch control mechanism, said pitch over-ride device having an actuated position in which it automatically reduces the pitch of said airscrew, means to render inoperative said connection between said pilot's airscrew pitch control and said pitch control mechanism when said pitch over-ride device is in said actuated position, control means for said pitch over-ride device associated with said automatic power control device and having an actuated position which it occupies when said automatic power control device attempts to increase the power output above a predetermined upper limit, and an operative connection between said control means and said pitch over-ride device adapted to actuate said pitch over-ride device when said control means is in its actuated position.

2. An aircraft propulsion unit according to claim 1 including means to render said other power consumer inoperative in another flight condition of said aircraft, and in which said control system includes a fuel metering device, a pilot's power control, an operative connection between said pilot's power control and said fuel metering device, an automatic airscrew pitch control unit, an operative connection between said pilot's power control and said automatic airscrew pitch control unit, an operative connection between said automatic airscrew pitch control unit and said pitch control mechanism, and means rendering said automatic airscrew pitch control unit operative only in said other flight condition, said automatic airscrew pitch control unit when operative adjusting the airscrew pitch to hold said engine speed at a value appropriate to the power output selected by said pilot's power control.

3. An aircraft propulsion unit according to claim 2 in which said automatic power control device comprises a throttle governor responsive to engine speed, and in which there is an operative connection between said throttle governor and said fuel metering device whereby said throttle governor controls the power output of said engine in said first-mentioned flight condition, and means for rendering said throttle governor operative and said automatic airscrew pitch control unit inoperative on a change from said other flight condition to said first-mentioned flight condition, and vice versa.

4. An aircraft propulsion unit according to claim 3 in which said pitch over-ride device comprises a servo motor, said pitch over-ride control means comprises a control valve for said servo motor, and said operative connection between said throttle governor and said fuel metering device includes a servo motor adapted to actuate said control valve when said throttle governor servo motor is moved by said throttle governor to a position beyond its maximum fuel position in response to an overload on said engine.

5. An aircraft propulsion unit according to claim 3 which includes cut-out means associated with said pitch over-ride device, a torque meter disposed in said driving connection between said engine and said airscrew, and an operative connection between said torque meter and said cut-out means arranged to actuate said cut-out means to render said pitch device inoperative when the torque sensed by said torque meter is below a predetermined value.

6. An aircraft propulsion unit according to claim 5 including an over-riding pitch-coarsening device having an actuated position in which it sets said airscrew into a coarse pitch position, and an operative connection between said torque meter and said pitch-coarsening device adapted to actuate said pitch-coarsening device when a reverse torque is sensed by said torque meter.

7. An aircraft propulsion unit comprising a plurality of engines, a plurality of airscrews, driving connections between said engines and said airscrews, at least one helicopter rotor, driving means between said engines and said rotor, means rendering said driving means operative for operation of said aircraft as a helicopter and inoperative for operation of said aircraft as an aeroplane, and a control system for said propulsion unit, said control system comprising mechanism for adjusting the pitch of each airscrew, a pilot's airscrew pitch control for each airscrew, a connection between each pilot's airscrew pitch control and the corresponding pitch control mechanism whereby the pilot can control the pitch of the airscrews independently, a pitch override device for each airscrew, an operative connection between each said pitch over-ride device and said pitch control mechanism of its respective airscrew, each said pitch over-ride device having an actuated position in which it automatically reduces the pitch of its respective airscrew, means to render inoperative each said connection between said pilot's airscrew pitch controls and said pitch control mechanisms when the respective pitch over-ride device is in said actuated position, control means for each of said pitch over-ride devices each associated with the automatic power control device of the corresponding engine and having an actuated position which it occupies when the corresponding automatic power control device attempts to increase the power output of its associated engine above a predetermined limit, and an operative connection between each said control means and its corresponding pitch over-ride device adapted to actuate said pitch over-ride device when said control means is in its actuated position.

8. An aircraft propulsion unit according to claim 7 in which said control system includes a fuel metering device for each engine, a pilot's power control for each engine, an operative connection between each said pilot's power control and the corresponding fuel metering device whereby the pilot can regulate the power output of each engine independently, an automatic airscrew pitch control unit for each airscrew, an operative connection between each said pilot's power control and the automatic pitch control unit of the corresponding airscrew, an operative connection between each said automatic airscrew pitch control unit and the pitch control mechanism of the corresponding airscrew, and means to render said automatic airscrew pitch control units operative only in said aeroplane flight condition to adjust the pitch of the corresponding airscrew to hold the speed of the corresponding engine at a value appropriate to the power output selected by the corresponding pilot's power control.

9. An aircraft propulsion unit according to claim 8 in which each of said automatic power control devices comprises a throttle governor responsive to the speed of the corresponding engine, and in which there is an operative connection between each said throttle governor and the corresponding fuel metering device whereby said throttle governor controls the power output of said engine in said helicopter flight condition, and means for rendering each said throttle governor operative and the corresponding automatic airscrew pitch control unit inoperative on a change from said aeroplane flight condition to said helicopter flight condition, and vice versa.

10. An aircraft propulsion unit according to claim 9 in which each of said pitch over-ride devices comprises a servo motor, each of said pitch over-ride control means comprises a control valve for the corresponding servo motor, and each of said operative connections between said throttle governors and said fuel metering devices includes a servo motor adapted to actuate the corresponding control valve when the corresponding throttle governor servo motor is moved by its throttle governor to a position beyond its maximum fuel position in response to an overload on the corresponding engine.

11. An aircraft propulsion unit according to claim 9 which includes cut-out means for each of said pitch over-ride devices, a torque meter disposed in each of said driving connections between said engines and said airscrews, and operative connections between each of said torque meters and the corresponding cut-out means arranged to actuate said cut-out means to render the corresponding pitch over-ride device inoperative when the torque sensed by said torque meter is below a predetermined value.

12. An aircraft propulsion unit according to claim 11 including an over-riding pitch coarsening device for each airscrew having an actuated position in which it sets said airscrew into a coarse pitch position, and an operative connection between each of said torque meters and the corresponding pitch-coarsening device adapted to actuate the corresponding pitch-coarsening device when a reverse torque is sensed by any of said torque meters.

References Cited in the file of this patent

UNITED STATES PATENTS

| | | |
|---|---|---|
| 2,523,186 | Bennett | Sept. 19, 1950 |
| 2,653,778 | Bennett et al. | Sept. 29, 1953 |
| 2,689,615 | Fletcher | Sept. 21, 1954 |

FOREIGN PATENTS

| | | |
|---|---|---|
| 743,414 | Great Britain | Jan. 18, 1956 |
| 953,213 | France | Dec. 2, 1949 |